United States Patent Office 3,412,051
Patented Nov. 19, 1968

3,412,051
PENTAERYTHRITOL PHOSPHITES AS FLAME-RE-
TARDANTS IN FOAMS AND ELASTOMERS
Charles F. Baranauckas and Irving Gordon, Niagara
Falls, N.Y., assignors to Hooker Chemical Corporation,
Niagara Falls, N.Y., a corporation of New York
No Drawing. Original application July 16, 1963, Ser. No.
295,503, now Patent No. 3,310,609, dated Mar. 21,
1967. Divided and this application Aug. 25, 1966, Ser.
No. 600,283
3 Claims. (Cl. 260—2.5)

ABSTRACT OF THE DISCLOSURE

This invention is directed to the novel composition such as polyvinyl chloride resin or a polyurethane foam which includes novel phosphites formed by reacting a pentaerythritol-type product with a triorgano phosphite, for example.

---

This application is a division of our application Ser. No. 295,503, filed July 16, 1963, now U.S. Patent 3,310,609, patented Mar. 21, 1967.

This invention relates to novel phosphites and methods for their preparation and compositions containing them. More particularly, this invention relates to novel pentaerythritol-, and dipentaerythritol-, phosphites.

It has been found that novel phosphites may be formed by reacting a pentaerythritol-type product with a triorgano phosphite. In some instances, it is possible to prepare the novel phosphites by reacting the appropriate di-aromatic monohalophosphite or aromatic dihalophosphite with pentaerythritol, dipentaerythritol or tripentaerythritol. However, it is preferred to react a phosphorus-containing compound having the formula:

$$(RO)_3P$$

wherein R may be selected from the group consisting of aryl, or alkyl hydrocarbon containing between about 1 and 20 carbon atoms, with pentaerythritol or its dimer or trimer. The products of the present invention which are prepared from pentaerythritol and dipentaerythritol are selected from the group consisting of

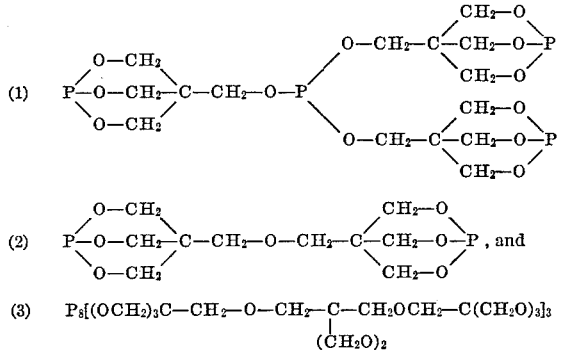

The product illustrated by Formula 1 above may preferably be made by reacting four moles of a phosphorus-containing composition as described above with three moles of pentaerythritol. The product illustrated by Formula 2 above may preferably be made by reacting two moles of a triorgano phosphite as set forth above with one mole of dipentaerythritol, with the prdouct of Formula 3 being preferably made by reacting 8 moles of a triorgano phosphite with three moles of tripentaerythritol.

These new compounds may be utilized as stabilizers in organic resins. They can be used as heat and light stabilizers for halogen-containing vinyl and vinylidene resins. They are also useful as fire retardants in organic resins.

Suitable starting phosphites which may be employed are triorgano phosphites containing between about 1 and 20 carbon atoms per organo group, R usually being between about 1 and 10 carbon atoms and preferably being between about 1 and 6 carbon atoms. Examples of triorgano phosphites which may be utilized in the practice of this invention are both aromatic and aliphatic compounds, e.g., trimethyl phosphite, triethyl phosphite, triisopropyl phosphite, tributyl phosphite, trihexyl phosphite, tris(2-chloroethyl) phosphite, tris (2-chloroisopropyl) phosphite, tris(2-bromoethyl) phosphite, tris(2-bromoisopropyl) phosphite, triphenyl phosphite, phenyl ethylene phosphite, tricresyl phosphite, diethyl methyl phosphite, phenyl didecyl phosphite, diphenyl hexyl phosphite, tris (ethoxyethyl) phosphite, methyl ethyl propyl phosphite, phenyl methyl ethyl phosphite, hexyl butyl methyl phosphite, di-(methoxyethyl) phenyl phosphite, methoxyethyl diphenyl phosphite, di(butoxyethyl) phenyl phosphite, tri(butoxyethyl) phosphite, trichloroethyl phosphite, trichlorophenyl phosphite, tribromopropyl phosphite, and phenyl chloro methyl phosphite.

In addition to the above-listed phosphites, which are only illustrative, the following intermediate phosphite compounds which are reaction products of pentaerythritol and a phosphite may be utilized in this invention in the preparation of the product of Formula 1.

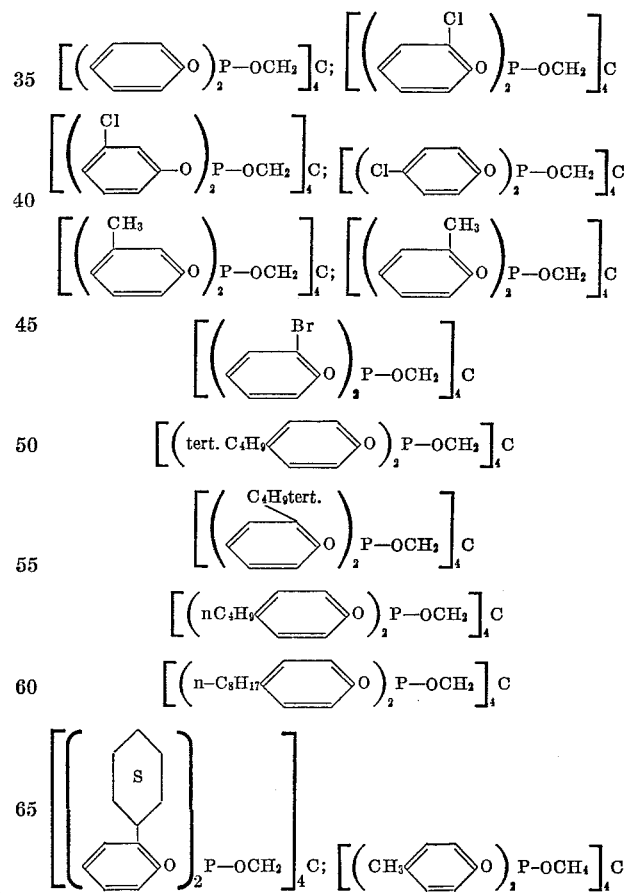

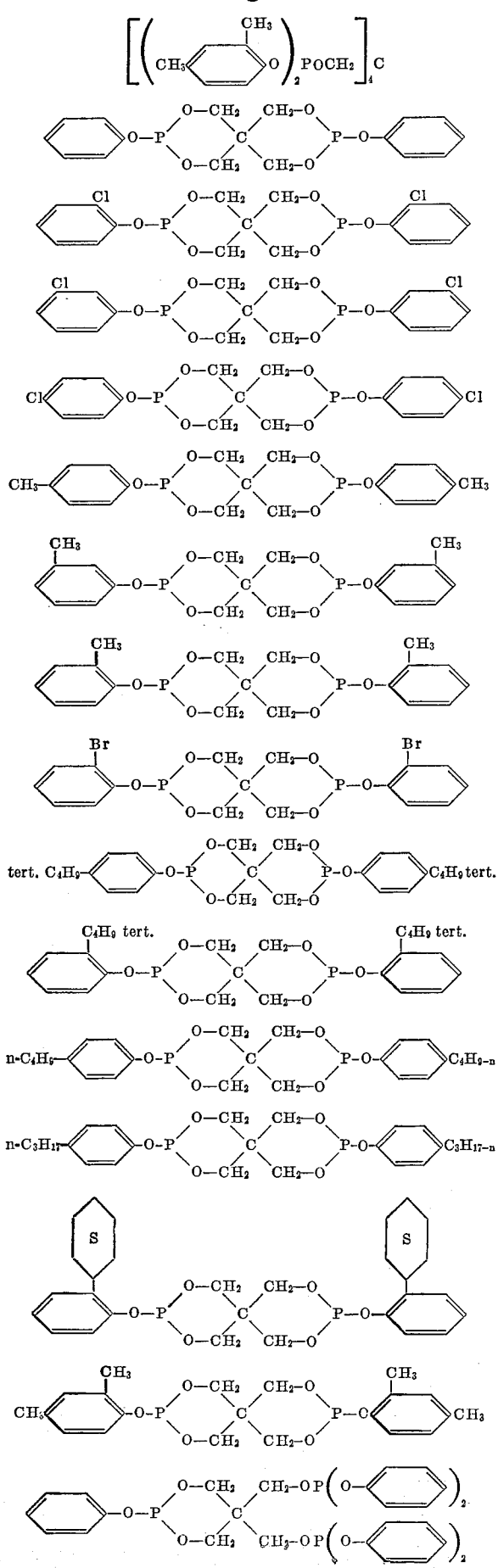
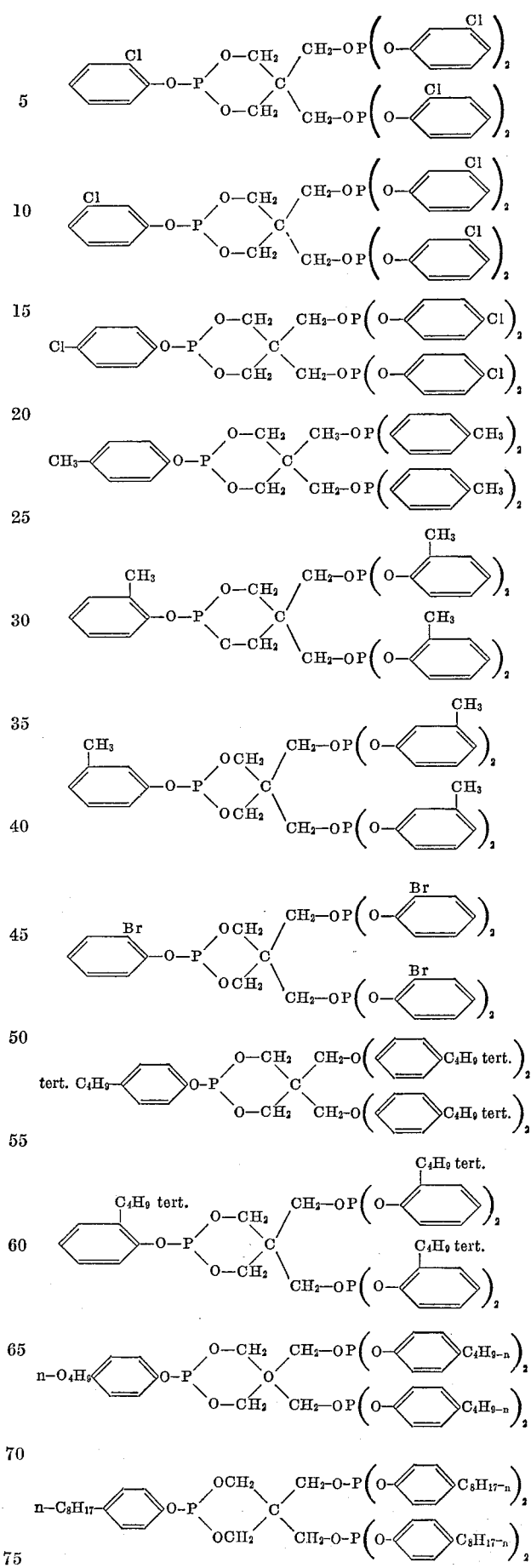

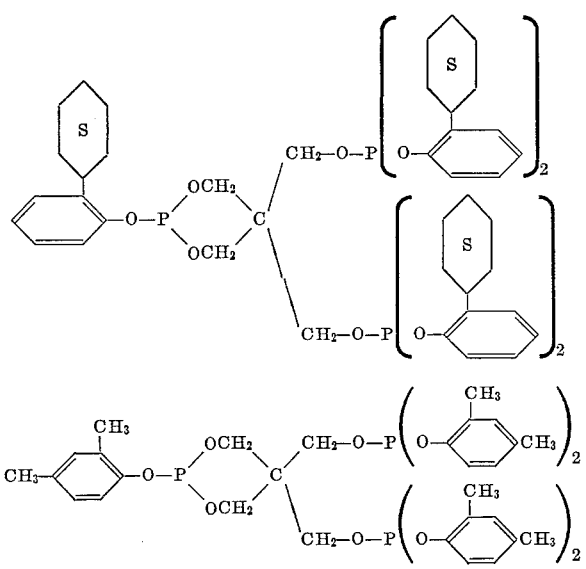

Some of these intermediate phosphites are believed to be formed during the preparation of the compound illustrated by Formula 1 by the preferred method. Therefore, by means of these intermediate phosphites the product of Formula 1 may be formed by the addition of pentaerythritol. Of course the proportions of the reactants employed will be in accordance with the previous teachings and will be those which will yield the desired product. Products having a similar formula as the product of Formula 2 may be prepared by reacting an organic phosphite with a compound having the formula

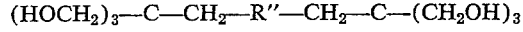

wherein R″ is aromatic or aliphatic hydrocarbon containing from 1 to 20 carbon atoms.

This reaction is preferably conducted in the presence of a small but effective amount of a transesterification catalyst. The catalyst may be present in the reaction mixture in an amount of from .03 percent to about 1.5 percent by weight of the phosphorus-containing compound. However, it is preferable to add between about .5 and 1 percent by weight of the phosphorus-containing compound. The catalyst may be a metal alcoholate or metal phenolate. Typical examples of these catalysts are alkali metal and alkaline earth metal alcoholates and phenolates, usually of 1–20 carbon atoms per molecule, e.g., sodium methylate, lithium methylate, potassium methylate, sodium ethylate, sodium isopropylate, sodium dodecylate, sodium cetylate, sodium octadecylate, sodium phenolate, potassium phenolate, sodium cresylate, calcium ethylate, and so forth. Strong organic bases and inorganic bases are also useful catalysts. Typical of such bases are quaternary ammonium hydroxides, such as trimethyl benzyl ammonium hydroxide and substituted guanidines, such as pentamethyl guanidine. Strong inorganic bases such as sodium hydroxide and potassium hydroxide also are suitable.

The reaction between the phosphorus-containing compound and pentaerythritol or dipentaerythritol may be carried out over a wide temperature range, e.g., from about 10 degrees centigrade to about 300 degrees centigrade or to reflux temperature, in many instances. It is preferred to conduct the reaction, however, under temperatures and pressures that will allow the by-product, generally a phenolic and/or alcoholic material, to be stripped easily as the reaction proceeds. Temperatures of between about 25 and 200 degrees centigrade are preferred. Although preferred, a catalyst is not required to make the reaction take place. Use of a catalyst in addition to speeding the rate of reaction, also will cause the reaction to take place at lower temperatures, such as 20 degrees centigrade or room temperature or lower.

The by-products of this invention may be removed by vacuum distillation, crystallization, precipitation and any other suitable techniques for recovering the products of this invention.

The following examples are presented to illustrate the invention without limiting it to the specific materials, proportions or conditions specified therein. All parts are by weight and all temperatures are in degrees centigrade, unless otherwise indicated.

EXAMPLE 1

Triphenyl phosphite (413 parts), soduim hydride (1.65 parts) and pentaerythritol (136 parts) were added to a vessel and liquefied by heating under atmospheric pressure to a temperature of between about 60 and 65 degrees centigrade. The vessel was then heated to a temperature of between 140 to 145 degrees centigrade at a pressure of 0.10 mm. mercury absolute. At the end of about three hours the theoretical amount of phenol was distilled off and recovered. A hard solid which had a decomposition point of between about 240 and 250 degrees centigrade remained in the vessel. The product was recovered in a yield which was approximately 96 percent of theoretical. Infrared analysis is consistent with the product of formula

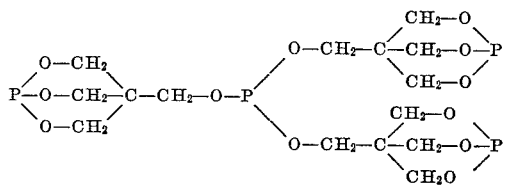

and

The phosphorus content was: actual—22.9%; theoretical—23.8%.

EXAMPLE 2

Triphenylphosphite (35.45 parts), dipentaerythritol (14.55 parts), and sodium hydride (.35 part) were added to a reaction vessel containing phenol (50 parts). The reactants were heated to a temperature of between about 100 and 110° centigrade until all the reaction mixture was in a liquid state. After an hour at 100–110 degrees centigrade, phenol was stripped at a temperature of 145 degrees centigrade at .05 millimeter absolute vacuum. After the phenol was stripped, the reaction mixture was cooled down and vacuum released under a nitrogen atmosphere. The residue was analyzed for phosphorus. Infrared analysis of the product is consistent with the formula

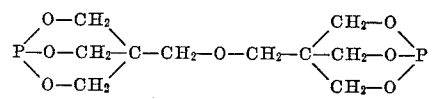

EXAMPLE 3

Tributyl phosphite (35.5 parts), pentaerythritol (14.5 parts), sodium hydride (14.5 parts) and phenol (50 parts) were admixed and reacted at about 110 degrees centigrade until the reactants became liquid. Butanol and phenol were then removed as the reaction progressed, coming off at temperatures of about 85 to 110 degrees centigrade at a pressure of 35 millimters of mercury absolute for butanol and between about 90 and 160 degrees centigrade and from 70 to 1.5 millimeters of mercury for phenol. The product solidified on cooling. The yield was about 99 percent of theoretical having the formula

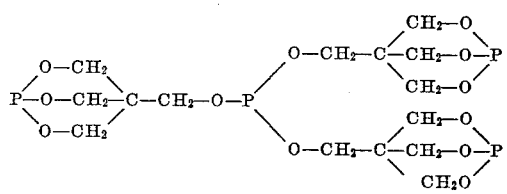

EXAMPLE 4

A starting polyester was prepared in the normal manner, by esterifying two moles of trimethylol propane with one mole of adipic acid to an acid number below 10. This polyester had a hydroxyl number of 504. A prepolymer was prepared by heating 20 parts of the above polyester with 80 parts of toluene diisocyanate at 80 degrees centigrade for one-half hour. A urethane foam was made according to the following formula

| Material | Parts |
|---|---|
| Trimethylolpropane polyester | 200 |

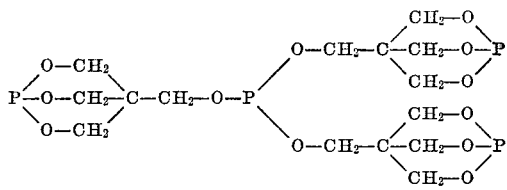

| | |
|---|---|
| Pre-polymer | 20 |
| Trichlorofluoro methane | 60 |
| Silicone oil | 1.2 |
| Tetramethylbutane diamine | 1.4 |

The above formulation was mixed for 25 seconds and was poured. The foam peaked at 60 seconds after pouring and cured at ambient temperatures. Table I illustrates the flameproofing ability of the novel compound utilizing the ASTM D-757-49 Flameproofing Test.

TABLE I

| | Control Urethane Foam | Flameproofed Urethane Foam |
|---|---|---|
| Density (pounds per cubic foot) | 1.89 | 1.99 |
| Yield under compression (pounds per square inch) | 41.3 | 33.3 |
| Percent open cell | 0–7 | 0 |
| American Society for Testing Materials Procedure D-757-48, inches/min | 9.43 | 1.07 |
| Humid Ageing Test: | | |
| Vol. charge, 70° C./week | +35.9 | +3.80 |
| Vol. charge, 90° C./hour | +20.7 | +7.6 |

The control was poured in the manner indicated above, but did not contain

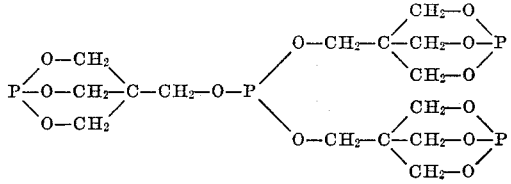

The fire retarding action of the phosphorus additive of this invention in urethane foams is readily shown by Table 1.

EXAMPLE 5

This example illustrates the utility of

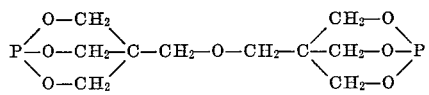

as a stabilizer in vinyl and vinylidene resins.

0.8 part of the compound having the structure illustrated above and prepared as set forth in Example 1 was stirred into 22.5 parts of di-2-ethylhexylphthalate. One part of barium cadmium laurate and 50 parts of polyvinyl chloride was then added and mixed in. Controls were made at the same time using the above reactants but excluding the phosphite of Formula 1.

The above mixture was milled on a small rubber mill (rolls preheated to 300° F.) with a mixing time of about three minutes; and a milling time of about five minutes.

A polyvinyl chloride film of about 45 mils thickness is produced.

The milled sheets were cut into ¾ inch by 1¼ inch rectangles, placed on a 6 x 6 inch glass plate, and the plates were placed in a 350° F. oven. These samples were heated as a means of accelerating aging. Samples (plate by plate) were removed from the oven at fifteen-minute intervals until there was a complete blackening of all the remaining samples. The cooled samples were then examined and visual comparisons of color development were made. The lack of color development is a measure of stabilizing efficiency.

A visual comparison of color development showed that the controls, containing no phosphite additives, were brown after forty-five minutes and black thereafter. The phosphite treated samples were essentially colorless and unblackened after 150 minutes at 350° F. The phosphite treated samples also showed no signs of bubbling during this period of time while the controls did show signs of bubbling. Similar flameproofing heat and light stabilizing results are obtainable when

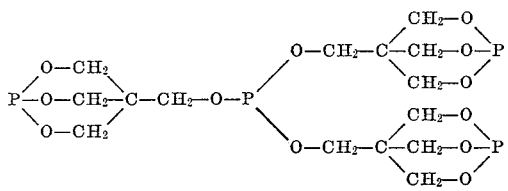

is used instead of

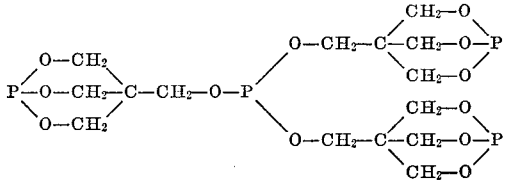

in these organic resins.

This is also true when the compound having the formula $$P_3[(OCH_2)_3-C-CH_2-O-CH_2-C-CH_2-O-CH_2-C(CH_2O)_3]_3$$
$$(\overset{|}{C}H_2O)_2$$

is utilized instead of

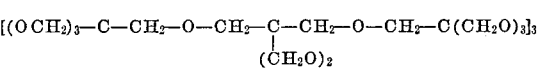

Triphenyl phosphite (.166 mole), tripentaerythritol (.06215 mole) and sodium methoxide (.00415 mole) were added to a reaction vessel with phenol as a solvent (75 grams) and heated at about 152 degrees centigrade until they liquefied (about two hours). The reaction vessel was then cooled to about 100 degrees centigrade and solvent and by-product phenol removed from the reaction mixture at from about 100 degrees centigrade at atmospheric pressure to about 170 degrees centigrade at 1 millimeter of mercury absolute. A brown glass like material was recovered which was washed with ether to remove any possible impurities. This product had a melting point of 99–105 degrees centigrade. Infrared analysis confirmed the identity of the product having a formula:

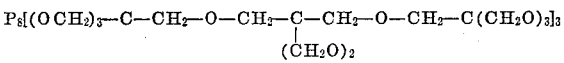

Analysis for phosphorus disclosed the following:
Calculated for phosphorus: theory—18.25; actual—17.4.

It will be recognized by those skilled in the art that various modifications within the invention are possible

We claim:
1. A fire retardant synthetic composition selected from the group consisting of a polyurethane composition and a polyvinyl halide resin containing a pentaerythritol type phosphite selected from the group consisting of:

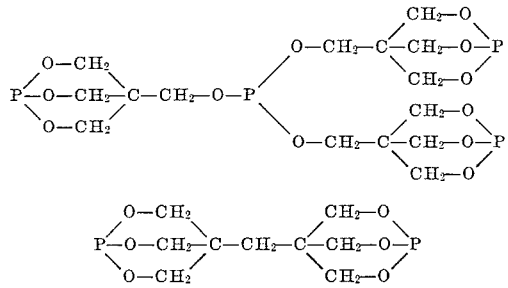

and

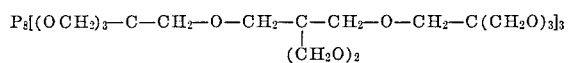

2. A fire-retardant synthetic composition selected from the group consisting of a polyurethane composition and a polyvinyl chloride resin, containing a pentaerythritol type phosphite selected from the group consisting of:

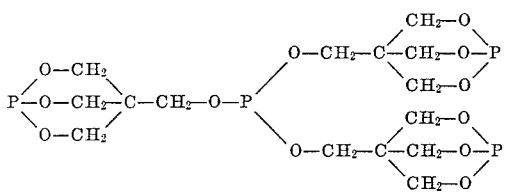

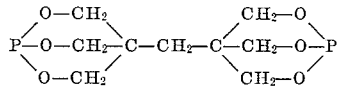

and

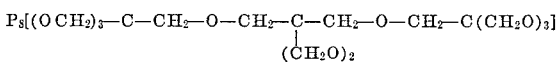

3. A fire retardant polyurethane foam containing a pentaerythritol type phosphite selected from the group consisting of

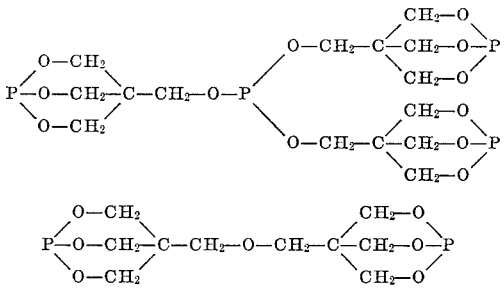

and

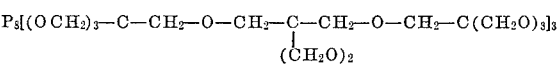

References Cited

UNITED STATES PATENTS

| | | | |
|---|---|---|---|
| 3,000,850 | 9/1961 | Ainsworth | 260—45.7 |
| 3,210,319 | 10/1965 | Huhn et al. | 260—45.8 |
| 3,245,926 | 4/1966 | Parker | 260—23 |

DONALD E. CZAJA, *Primary Examiner.*

H. S. COCKERAM, *Assistant Examiner.*

UNITED STATES PATENT OFFICE
CERTIFICATE OF CORRECTION

Patent No. 3,412,051                                                      November 19, 1968

Charles F. Baranauckas et al.

It is certified that error appears in the above identified patent and that said Letters Patent are hereby corrected as shown below:

Column 4, line 22, the formula should appear as shown below:

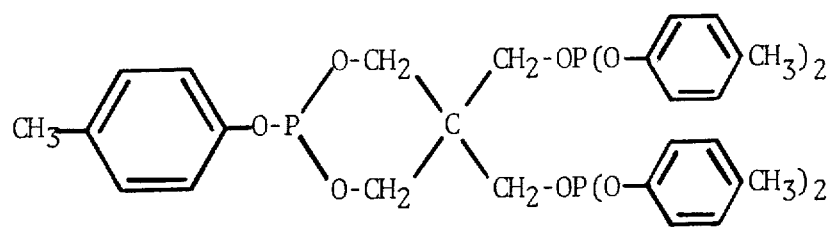

same column 4, line 52, the formula should appear as shown below:

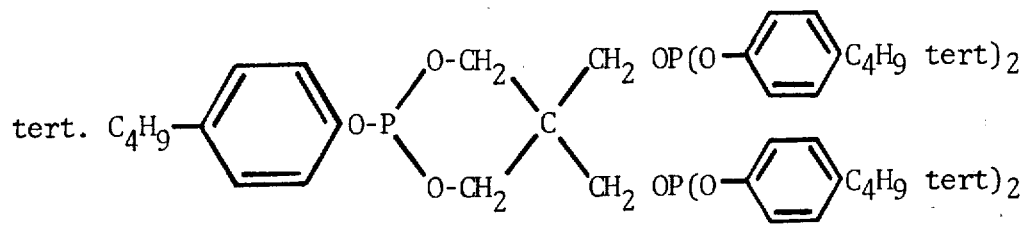

same column 4, line 66, the formula should appear as shown below:

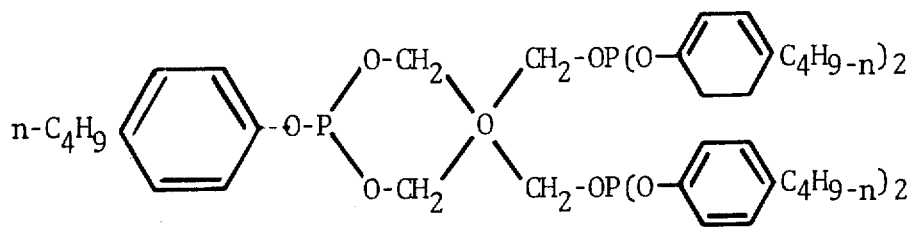

Column 6, line 63, the word after "35" should be corrected to read as -- millimeters --. Column 7, line 15, after the chemical formula, and under the column for "parts" insert -- 50 --.

Signed and sealed this 2nd day of June 1970.

(SEAL)
Attest:

EDWARD M. FLETCHER, JR.
Attesting Officer

WILLIAM E. SCHUYLER, J
Commissioner of Patent